No. 853,066. PATENTED MAY 7, 1907.
J. C. CRELLIN.
NUT GRADING AND SHELLING MACHINE.
APPLICATION FILED JULY 28, 1905.

2 SHEETS—SHEET 1.

WITNESSES.
William A Blanchard
Lily Bishop

INVENTOR.
John C. Crellin
By James A. Coubrough
Attorney

No. 853,066. PATENTED MAY 7, 1907.
J. C. CRELLIN.
NUT GRADING AND SHELLING MACHINE.
APPLICATION FILED JULY 28, 1905.

2 SHEETS—SHEET 2.

WITNESSES.
William A. Blanchard
Lily Bishop

INVENTOR:
John C. Crellin
By James A. Coubrough
Attorney.

UNITED STATES PATENT OFFICE.

JOHN C. CRELLIN, OF LIVERPOOL, ENGLAND.

NUT GRADING AND SHELLING MACHINE.

No. 853,066.  Specification of Letters Patent.  Patented May 7, 1907.

Application filed July 28, 1905. Serial No. 271,646.

*To all whom it may concern:*

Be it known that I, JOHN CAESAR CRELLIN, a subject of the King of Great Britain and Ireland, residing at 40 Park Lane, Liverpool, England, have invented a certain new and useful Improvement in Nut Grading and Shelling Machines, of which the following is a specification.

This invention relates to machinery for shelling palm-oil nuts and other hard nuts, so as to liberate their kernels.

The invention has also reference to the necessary means for grading or sorting such nuts before they are submitted to the cracking operation.

The shells of certain species of nuts vary considerably both in size and shape or contour. For example—with reference more particularly to palm-oil nuts—there is no uniformity either in the size or shape of their shells. Consequently in designing a machine for the purpose of cracking the shells of such nuts, the first object to be attained is the provision of means whereby such nuts may be graded or sorted before they are dealt with by the crackers. In dealing with palm-oil nuts—for which this invention is particularly applicable—provision must be made for their great variance in size and contour. Hardly two nuts in a parcel are alike in contour. They vary from the approximately spherical and oval to the filbert and other irregular shapes. According to the present invention such nuts are graded according to their lesser girth. For example, oval or elongated nuts will be graded to their lesser girth and will thus be sorted with approximately spherical nuts having that girth. The cracking devices according to this invention will be similarly adapted to deal with nuts which have been graded according to their lesser girth.

In carrying this invention into practical effect employment is made of revolving rollers for the primary purpose of grading the nuts and also for the purpose of cracking their shells. The forms of these rollers and their disposition relatively to one another, and their inclination, are such that the nuts pass between such rollers at the place where the space between the rollers will accommodate the lesser girth of the shell. Such spaces, as regards the grading rollers, will permit a nut to pass, but as regards the cracking rollers will be insufficient to allow the nut to pass uncracked.

Figure 1:
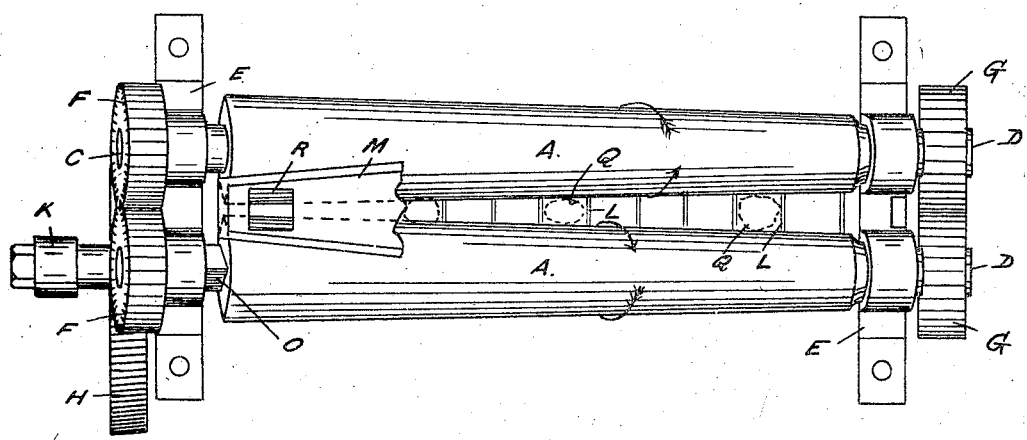
Figure 2:
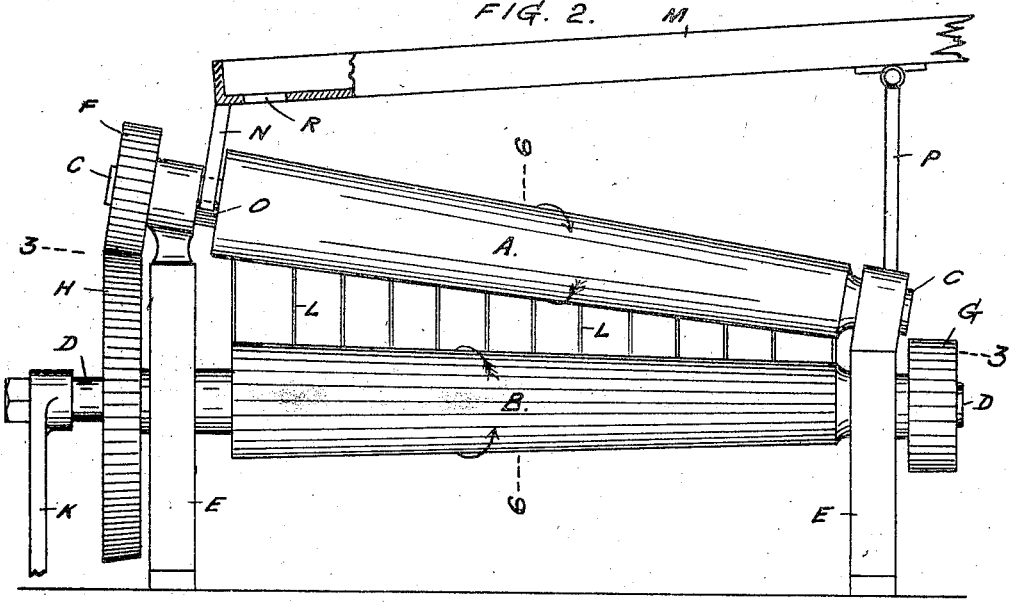
Figure 3:
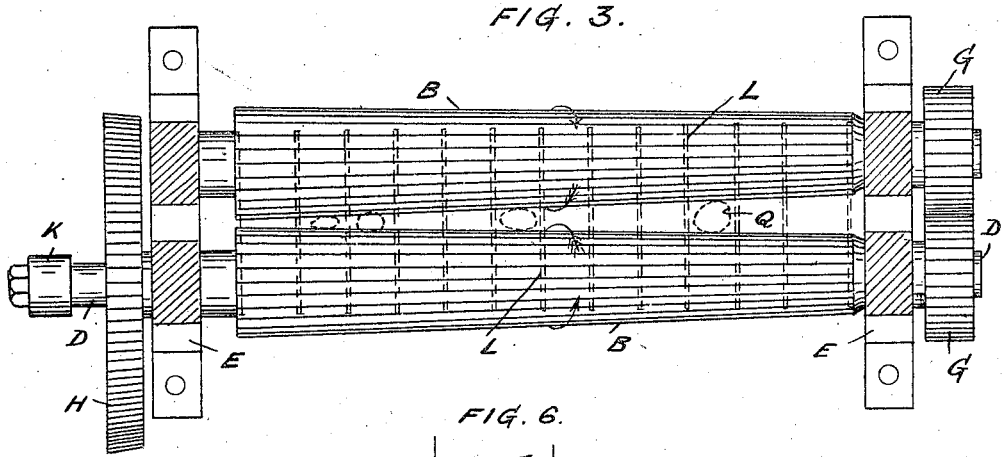
Figure 6:
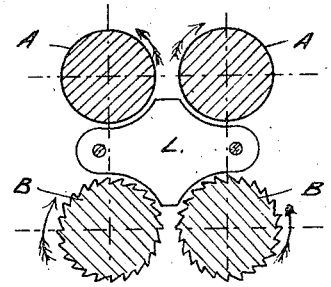
Figure 4:
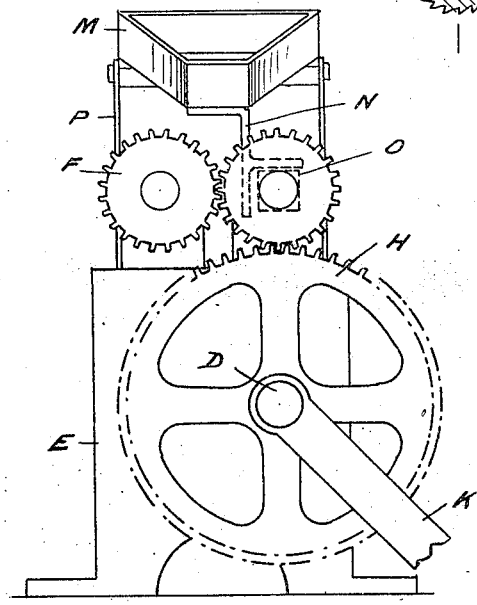
Figure 5:
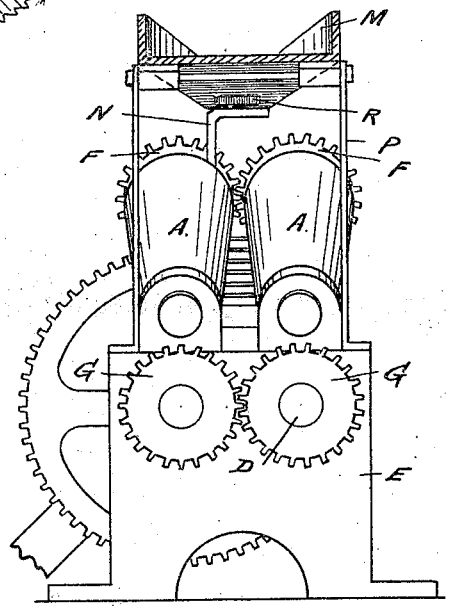

In the annexed drawings Figure 1 is a plan of a nut grading and shelling machine constructed according to this invention, Fig. 2 being a side elevation thereof, and Fig. 3 is a sectional plan on line 3—3 Fig. 2. Figs. 4 and 5 are front and rear views of the machine, respectively. Fig. 6 is a cross section on line 6—6 Fig. 2.

The combined nut grading and cracking machine illustrated comprises a pair of grading rollers A, A, whose axes are inclined, and a pair of cracking rollers B, B, whose axes are horizontal. The rollers A are disposed directly above the rollers B, their journals C, D, being carried in suitable bearings in the frame E. Keyed on the journals C of the rollers A are the pinion wheels F, and keyed on the journals D of the rollers B are the pinion wheels G, and keyed on the extended journal D of one of the rollers B is the spurwheel H, the latter being in gear with one of the pinion wheels F. Fixedly mounted on the said extended journal D is the hand operated crank K. The directions in which the wheel H and the rollers A and B are caused to rotate by the operation of the said crank handle are indicated by arrows in Fig. 6. The surface of the rollers B is grooved or serrated as shown in Fig. 6, so that they will grip and crack the shells of the nuts Q passing between such rollers.

L are plates, formed to fit near to the circumference of the rollers B, the function of these plates being to insure that the nut enters between the rollers B at a point corresponding with the point at which it escaped from the grading rollers A.

M is the feeding chute hinged to the standards P and possessing an outlet aperture R, which chute is constantly shaken by means of the forked piece N riding upon the squared part O of the roller journal C, as shown in Fig. 4.

It will be seen that the grading rollers A are disposed directly above the cracking rollers B, and that the tapering of the grading rollers corresponds with that of the cracking rollers. The tapering space between the grading rollers, through which the nuts fall, is thus directly above the tapering space between the cracking rollers, in which the nuts are cracked, and corresponds therewith with the exception that the space between the cracking rollers is necessarily somewhat smaller. Consequently when a nut escapes between the grading rollers it falls directly into the space between the cracking rollers at the point where the latter are best adapted to crack the shell. It will also be seen that the contiguous or opposing faces of the grading rollers A A move upwardly and outwardly, that is, in the direction opposite to a feed motion. Fed on to the broader ends of the rollers A the tendency of the nuts is to gravitate to the narrower ends. It is found in practice that the rotation of the rollers A has a tendency to so manipulate the nuts that they ascape as soon as the space between the rollers will accommodate their lesser girth. That is to say, the nuts naturally lie with their greater lengths parallel with the axes of the rollers, and thus fall through as soon as the space permits them to do so.

Having now described my invention, what I claim as new and desire to secure by Letters Patent is:—

In a nut grading and shelling machine, a pair of tapered grading rollers whose axes are parallel and inclined, arranged directly above a pair of correspondingly tapered and grooved cracking rollers, said rollers being so geared with each other that the grading rollers rotate in opposite directions and in directions opposite to the directions of rotation of the cracking rollers, the directions of rotation of the grading rollers tending to expel the nuts fed on to them, while the direction of rotation of the cracking rollers operates to draw such nuts between such cracking rollers, means for rotating such rollers, and means for feeding nuts on to the grading rollers and for guiding them therefrom on to the cracking rollers, as described.

JOHN C. CRELLIN.

Witnesses:
JAMES A. COUBROUGH,
S. T. THOMSON, Junr.